United States Patent [19]

Waehner

[11] Patent Number: 4,745,479
[45] Date of Patent: May 17, 1988

[54] MULTIPLE IMAGE VIDEO DISPLAY SYSTEM

[75] Inventor: Glenn C. Waehner, New Canaan, Conn.

[73] Assignee: American Dynamics Corporation, Orangeburg, N.Y.

[21] Appl. No.: 784,334

[22] Filed: Oct. 4, 1985

[51] Int. Cl.$^4$ ............................................. H04N 5/262
[52] U.S. Cl. ..................................... 358/183; 358/22
[58] Field of Search ................. 358/183, 182, 22, 160; 340/791, 798

[56] References Cited

U.S. PATENT DOCUMENTS

| | | | |
|---|---|---|---|
| 4,172,264 | 10/1979 | Taylor | 358/183 |
| 4,238,773 | 12/1980 | Tsuboka | 358/183 |
| 4,259,690 | 3/1981 | Nakanishi | 358/183 |
| 4,530,009 | 7/1985 | Mizokawa | 358/22 |
| 4,628,362 | 12/1986 | Waehner | 358/174 |
| 4,680,630 | 7/1987 | Field | 358/183 |

Primary Examiner—Tommy P. Chin
Attorney, Agent, or Firm—Peter L. Michaelson

[57] ABSTRACT

An image processing system, which receives asynchronous analog video output signals from a plurality of independently operating video cameras (preferably four) and simultaneously displays the image obtained from each camera, dimensionally reduced by a factor of two, on a non-overlapping basis on one video monitor, is described.

27 Claims, 7 Drawing Sheets

| FIG. 1A |
| FIG. 1B |

FIG. 3A

| ROW NO. | | 0 | 270 | 540 | 810 | 1080 | 1350 | 1620 |
|---|---|---|---|---|---|---|---|---|
| 1 | SELECTOR 700 | A/D 500 "ODD" | | XXX | | A/D 600 "EVEN" | | XXX | | A/D 500 "ODD" | | XXX |
| 2 | SELECTOR 860 | ADDRESS m OF "ODD" CAMERA 1 | | DISPLAY ADDRESS 1 | | ADDRESS n OF "EVEN" CAMERA 2 | | DISPLAY ADDRESS 2 | | ADDRESS m+1 OF "ODD" CAMERA 1 | | DISPLAY ADDRESS 3 |
| 3 | FRAME STORE MEMORY 800 — WRITING PIXELS INTO MEMORY FROM SELECTED "ODD" CAMERA | WRITE PIXELS m–(m+3) FOR "ODD" CAMERA 1 | | | | | | WRITE PIXELS (m+4)–(m+7) FOR "ODD" CAMERA 1 | |
| 4 | FRAME STORE MEMORY 800 — WRITING PIXELS INTO MEMORY FROM SELECTED "EVEN" CAMERA | | | | | WRITE PIXELS n–(n+3) FOR "EVEN" CAMERA 2 | | | |
| 5 | FRAME STORE MEMORY 800 — READING PIXELS FROM MEMORY FOR DISPLAY | | | READ OUT 4 PIXELS P1–P4 AT DISPLAY ADDRESS 1 | | | | READ OUT 4 PIXELS P5–P8 AT DISPLAY ADDRESS 2 | | | | READ OUT 4 PIXELS P9–P12 AT DISPLAY ADDRESS 3 |
| 6 | SHIFT REGISTER 940 | P r+4 | | | | P4 | | | | P8 | | |
| 7 | SHIFT REGISTER 930 | P r+3 | P r+4 | | | P3 | P4 | | | P7 | P8 | |
| 8 | SHIFT REGISTER 920 | P r+2 | P r+3 | P r+4 | | P2 | P3 | P4 | | P6 | P7 | P8 |
| 9 | SHIFT REGISTER 910 | P r+1 | P r+2 | P r+3 | P r+4 | P1 | P2 | P3 | P4 | P5 | P6 | P7 | P8 |
| 10 | D/A 970 | P r+1 | P r+2 | P r+3 | P r+4 | P1 | P2 | P3 | P4 | P5 | P6 | P7 | P8 |
| 11 | ANALOG OUTPUT FROM D/A 970 | V r+1 | V r+2 | V r+3 | V r+4 | V1 | V2 | V3 | V4 | V5 | V6 | V7 | V8 |

XXX = DON'T CARE

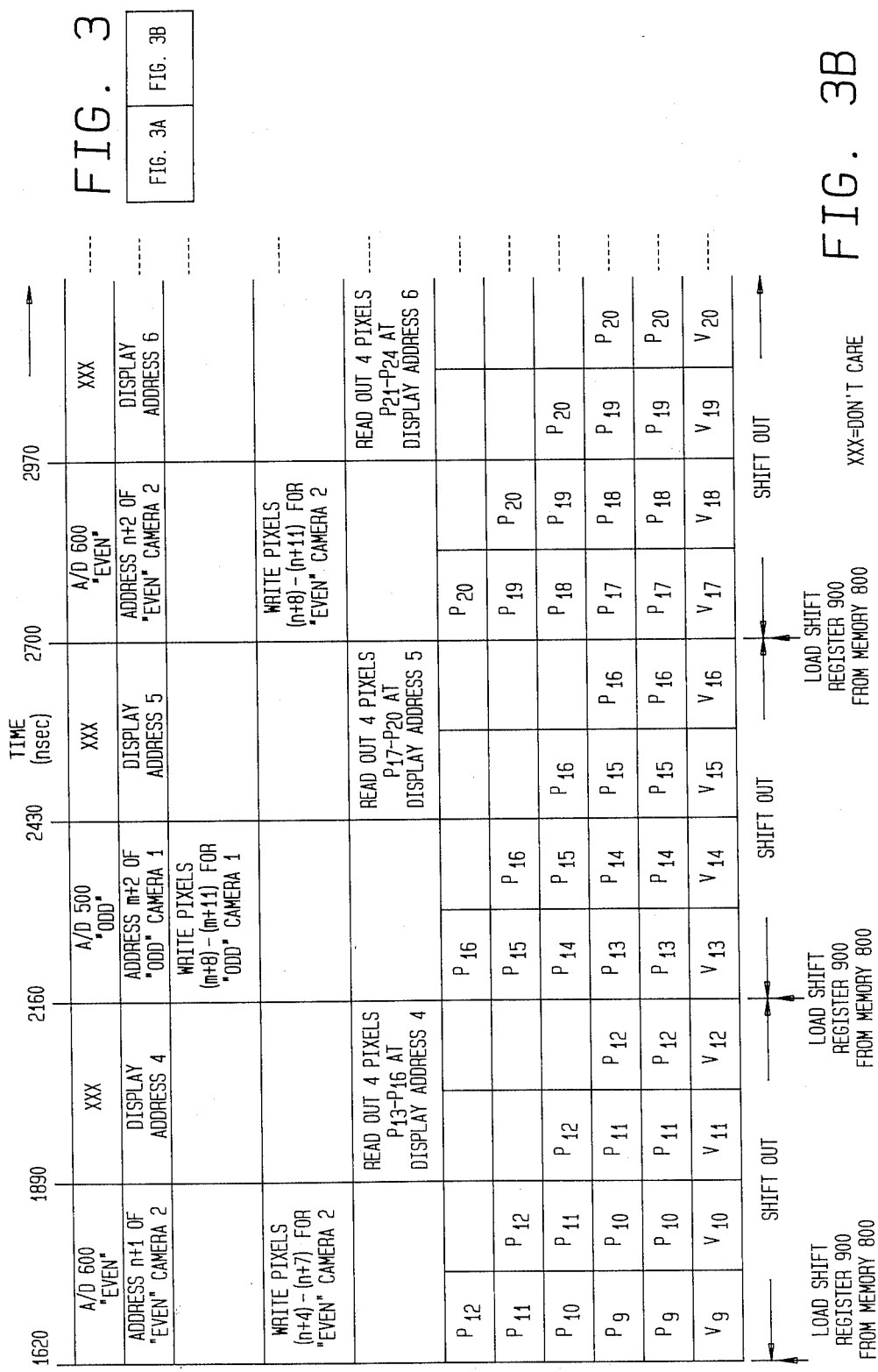

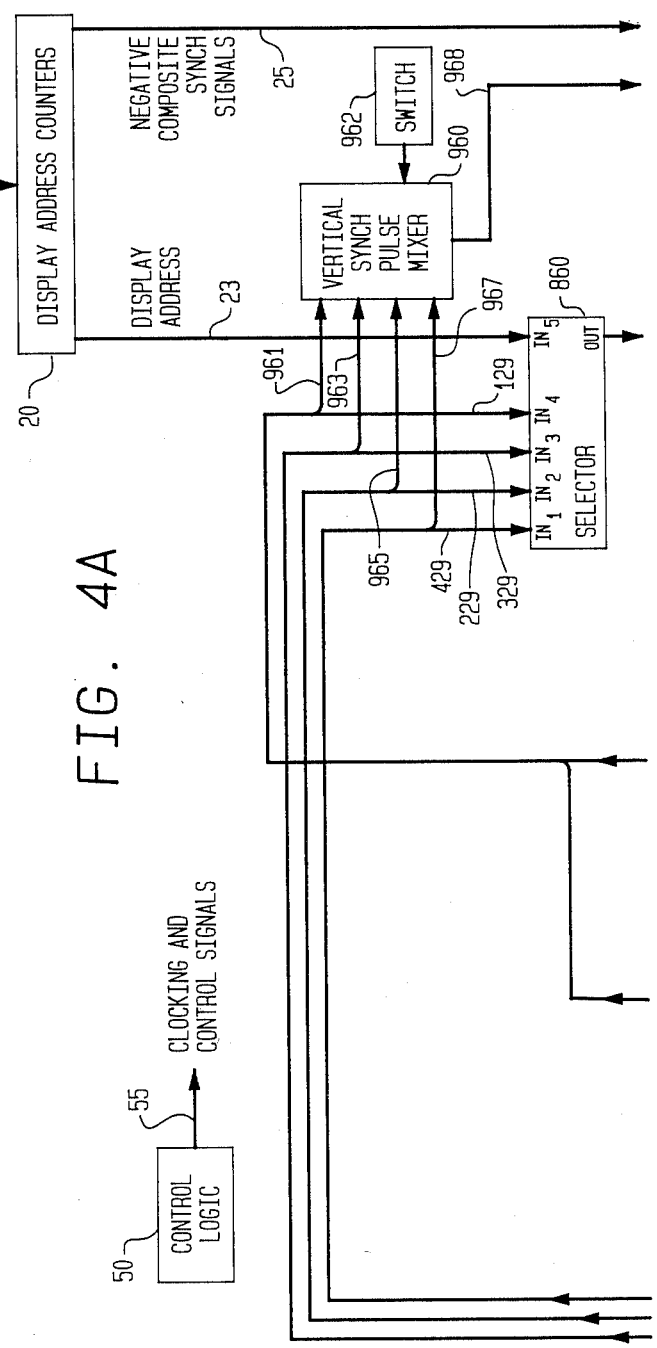

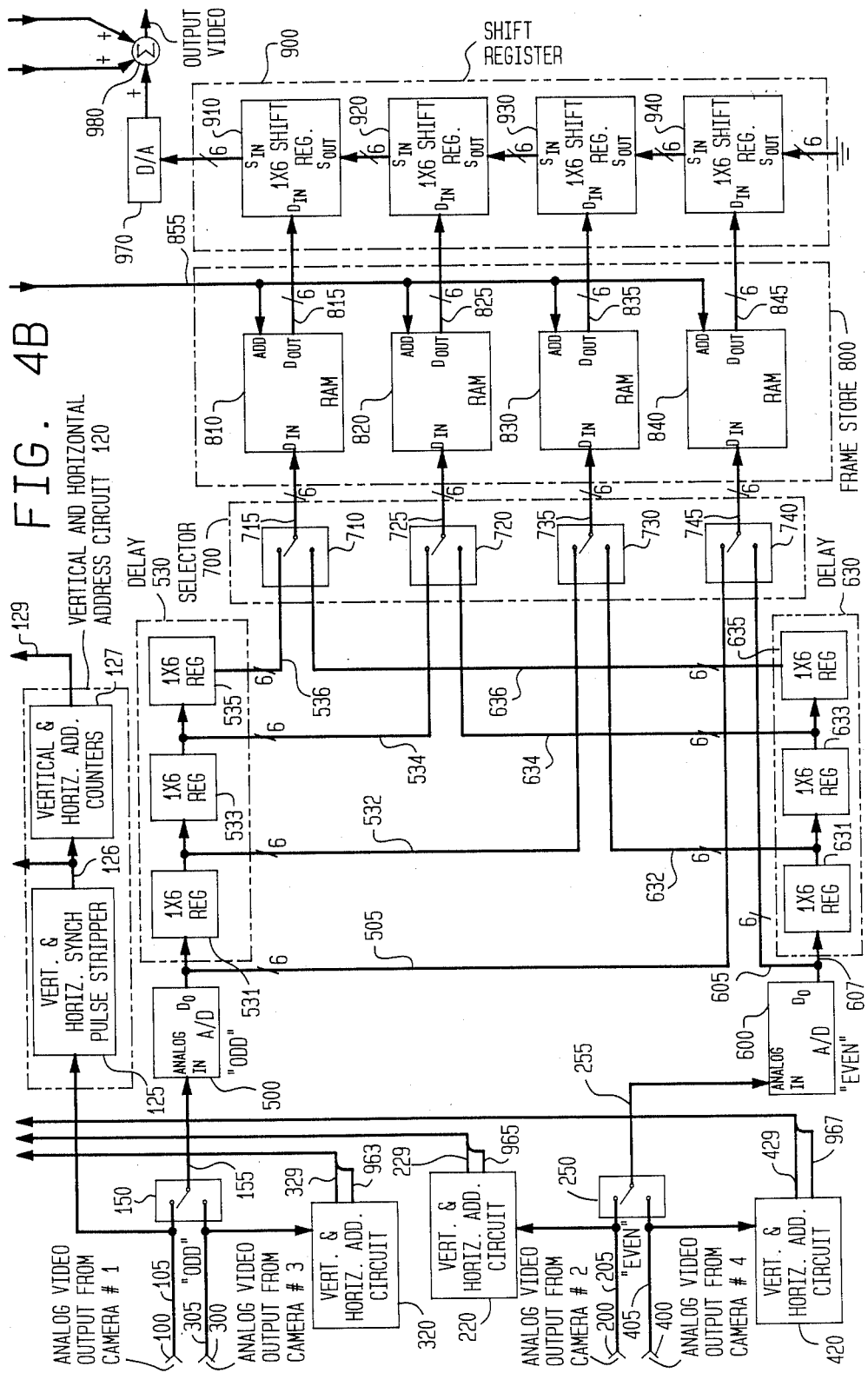

MULTIPLE IMAGE VIDEO DISPLAY SYSTEM

BACKGROUND OF THE INVENTION

1. Field of the Invention

The invention relates to an image processing system which receives asynchronous analog video output signals from a plurality of independently operating video cameras and simultaneously diplays the image obtained from each camera, dimensionally reduced by a factor of two, on a non-overlapping basis on one video monitor.

2. Description of the Prior Art

In video surveillance applications, one often needs to monitor areas situated at different locations. Illustrative applications include remote monitoring of: separate gaming tables at a casino, each entrance/exit at an apartment complex or office building, or stations along a production line or in a dangerous piece of equipment, e.g. a nuclear reactor. For these situations, a separate video camera is stationed at each location and positioned to repetitively scan a particular scene. The analog video output from all the cameras is then routed to a central location and displayed on remote video monitors located there. To minimize the number of separate remote monitors, one monitor is often used to display all the scanned images.

When, as in many surveillance applications, the scanned images change slowly, an operator does not have to continuously monitor each scanned area. Hence, a simple switch can be incorporated into the surveillance system at the central location to allow the operator to select which camera output is to be displayed at any instant on the remote monitor. Through experience, the operator will recognize which areas require more surveillance and which require less and will thereby change the setting of the switch to successively display all the scanned areas according to their respective needs for repetitive surveillance.

By contrast, so-called high surveillance applications impose very stringent surveillance requirements. Here, all the scanned images must be displayed continuously and no discretion must be given to an operator to select only one of the images for display at any one time and not to display the others. Therefore, in these high surveillance applications, a need has arisen to continuously and simultaneously display multiple scanned images on one remote video monitor.

In an optimum high surveillance system, all cameras should operate totally asynchronously with respect to each other. Furthermore, the video output from each camera should be digitized into at least 6 bits (for 64 gray levels) and then applied to a separate section of a large capacity frame store random access memory (RAM) which contains the digital representation of a single composite image. From the frame store memory, the composite image, in which all the component images are located in different nonoverlapping areas, is then sent, via an analog-to-digital (A/D) converter, to the remote monitor for display.

Unfortunately, the art has not surmounted one major technical hurdle, involving a speed-cost tradeoff inherent in frame store memory, which has effectively prevented a low-cost multiple image display surveillance system from being developed. Specifically, in order to display an image on a monitor with adequate resolution, the picture elements (pixels) comprising that image must be displayed at a high rate (approximately 7.5 MHz or 135 nano-seconds/pixel). To display all the video data in a frame store memory, the total number of writes to that memory must equal or be less than the total number of reads from that memory. However, if there are fewer writes than reads, then the display update rate will be compromised. Hence, the frame store memory must be implemented from RAM having a maximum memory cycle time of approximately 68 nano-seconds. This speed is four times faster than that of commonly available large capacity N-type metal-oxide semiconductor (NMOS))integrated circuit (IC) dynamic RAM chips. Moreover, RAM memory ICs having a 68 nano-second cycle time currently exist only in a few integrated circuit technologies (such as emitter coupled logic or bipolar), and those ICs which possess that capability disadvantageously consume an excessive amount of power and only have small memory sizes. Unfortunately, these small memory ICs are quite expensive. The high cost and excessively high power consumption prohibit the use of these relatively "fast" memory ICs in a high capacity frame store memory and has therefore precluded the use of a high capacity frame store memory in low cost multiple image display surveillance systems. In particular, one presently available multiple image display system, which utilizes a frame store memory and has the capability to simultaneously display 16 separate scanned images, unfortunately costs in excess of $25,000.00.

To circumvent this speed-cost limitation, a number of stop-gap solutions, aimed at eliminating the need for a high capacity frame store memory, appear in the art; however, as discussed below, all of these prior art solutions possess serious drawbacks of one form or another.

For example, one system, which sees wide use in the art, relies on using a first video camera as a master camera and a second video camera as a blockdriven synchronized slave camera. Operation of the slave camera is fully synchronized, both horizontally and vertically, with that of the master camera. In one mode of operation, the system can selectively display the scanned image produced by either camera, or alternatively, in another mode, can superimpose the images on top of each other to create a "picture-within-a-picture" display. In the latter mode, a region (window) in the image produced by the master camera (hereinafter referred to as the background image) is electrically defined. Part of the scanned image produced by the slave camera (the foreground image) is then written into that window. Unfortunately, this prior art system possesses one very serious drawback: the portion of the background image, which is covered by the foreground image, is not displayed at all. Hence, any activity occurring in that portion of the background image can not be seen by the operator. This deficiency renders this prior art system completely unsuitable for use in high surveillance and many other applications.

Another prior art system, which displays four separate images simultaneously as a composite image on one monitor, relies on synchronizing a group of four video cameras together, both horizontally and vertically, and operating each camera to scan its image four times faster than normal video scan rates (i.e. twice as fast vertically, and twice as fast horizontally). The composite image consists of four separate quadrants in which each quadrant contains the scanned image produced by a different one of the cameras. Control electronics, located external to the cameras, select the particular camera in real-time that is to provide picture information for any one portion of the composite image. Once the camera has been selected, it is then instructed to scan its image area and provide picture information during the time that portion is being displayed on the remote monitor. Since the vidicon tube within each camera must operate well in excess of its normal vertical and horizontal scan rates, this prior art system unfortunately produces a unclear picture. In particular, to produce a video signal having an optimum signal-to-noise (S/N) ratio, a vidicon must be operated at or near normal scan rates. Operation at significantly higher scan rates does not provide the vidicon with sufficient time, during the scanning of each picture element, to completely react to the available light. Consequently, the resulting image appears quite grainy. Moreover, synchronizable high scan rate cameras are not common in the industry and are thus disadvantageously quite expensive. In addition, since non-standard control (select) signals must be run to each camera, installation wiring becomes complicated.

Another prior art system relies on routing the video output from each one of four cameras to a separate monitor. All four monitors are then positioned close together inside a light-tight enclosure along with a fifth camera which scans the images produced on all the monitors. This fifth camera produces a composite image that contains the images generated on all four monitors. While this solution is quite simple, the composite image contains geometric distortion and usually suffers from poor contrast and brightness. Specifically, each of the four displayed images, by virtue of being displayed on a cathode ray tube (CRT), has rounded corners and artificial curvature. When each of the four displayed images is scanned by a camera and then displayed on another CRT, additional rounding and artificial curvature, i.e. geometric distortion, is introduced into the composite image. In addition, an automatic gain control circuit (AGC) exists in each camera to regulate the gain of that camera in response to the average value of the light intensity occurring over the entire image scanned by that camera. Hence, if any one of the four displayed images, in this prior art system, is unusually bright, then the AGC associated with the fifth camera will reduce its gain and unnecessarily darken the remaining three displayed images. Consequently, apart from the geometric distortion, the brightness of the four images in the composite image will interact, and hence these images may be displayed with insufficient brightness and contrast.

Thus, a need has existed for quite some time in the art to provide an effective, low-cost multiple image display system, for use in high surveillance applications.

SUMMARY OF THE INVENTION

Accordingly, an object of the present invention is to provide an effective multiple image display system which is substantially less expensive than those systems currently available in the art.

A particular object is to provide a system which uses a high capacity frame store memory.

A more particular object is to to implement the frame store memory using inexpensive high-capacity NMOS dynamic RAM integrated circuits.

Another particular object is to fully display all scanned images simultaneously on a remote monitor without any image blocking any portion of any other image.

Another object is to provide such a system which operates with any standard inexpensive video camera.

A further particular object is to eliminate both the need to use synchronously operating cameras, and the need to use cameras having non-standard scan rates and/or cameras which require non-standard control signals that complicate installation wiring.

Lastly, another object is to provide such a system in which each scanned image is clearly displayed with optimum signal/noise ratio, with proper brightness and contrast, and with minimum geometric distortion.

These and other objects are achieved in accordance with the teachings of the present invention by a multiple image video display system having a frame store memory that performs interleaved read and write operations. The system operates in accordance with the following method: repetitively selecting a successive one of a plurality of incoming video signals and writing at least one pixel value from each selected signal into the frame store memory during each memory write operation in order to form the composite image, and, to display the composite image, repetitively selecting at least one successive pixel value stored in the memory and reading that pixel value from the memory during each memory read operation interleaved between two successive memory write operations.

BRIEF DESCRIPTION OF THE DRAWING

The principles of the present invention may be readily understood by considering the following detailed description in conjunction with the accompanying drawing, in which:

FIG. 3 shows the proper alignment of the drawing sheets for FIGS. 3A and 3B;

FIGS. 3A and 3B depict a simplified timing chart of the operations performed by some of the basic circuits comprising the system shown in FIGS. 1A and 1B as well as the output voltages produced by and/or the contents of these circuits;

FIG. 4 shows the proper alignment of the drawing sheets for FIGS. 4A and 4B; and FIGS. 4A and 4B depict a modification of the multiple image video display system shown in FIG. 1.

To facilitate reader understanding, identical reference numerals are used to designate elements common to various figures.

DETAILED DESCRIPTION

Figures 1, 1A:
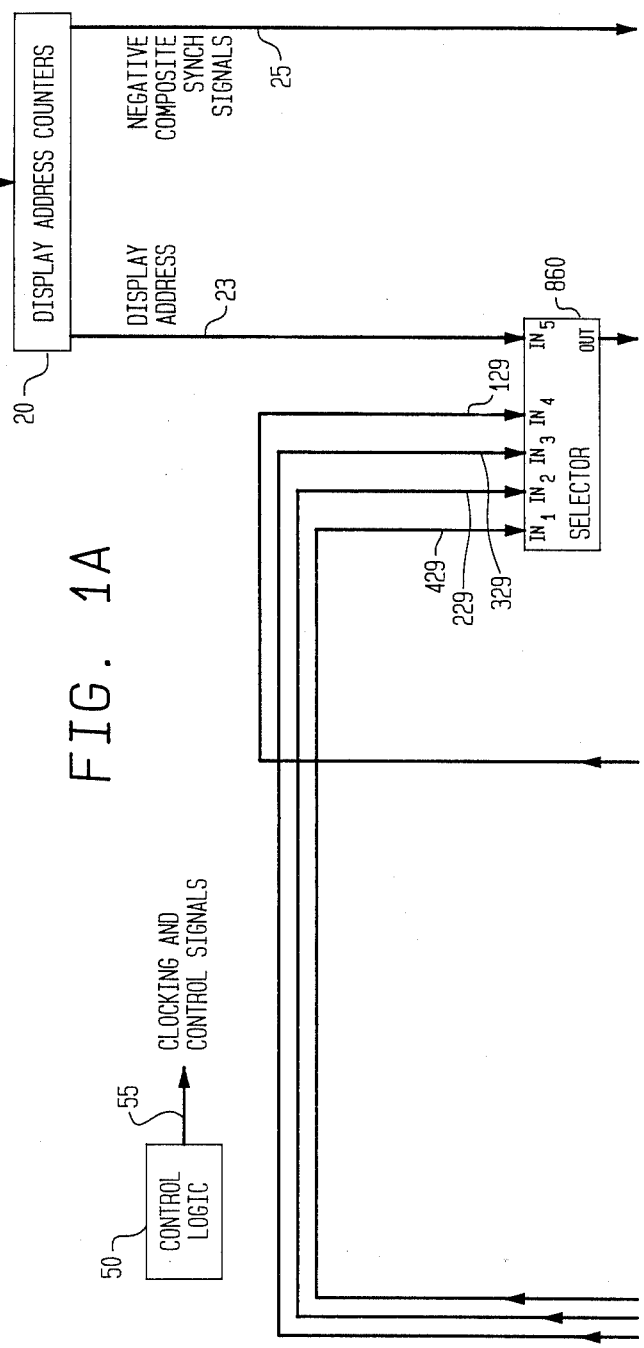
FIG. 1 shows the proper alignment of the drawing sheets for FIGS. 1A and 1B.
FIGS. 1A and 1B depict a block diagram of a multiple image video display system incorporating the principles of the present invention.

To simplify the drawing as well as the ensuing discussion, all the control signals in FIGS. 1A, 1B, 4A and 4B are collectively shown as clocking and control signals 55. Although these signals are not shown as feeding any one circuit block, those skilled in the art will clearly realize that, in actuality, certain ones of these control signals are routed to each circuit block shown in the drawing in order to control its operation. By considering the following detailed description of the circuitry shown in the drawing, the necessary control signals and their connections to the each circuit block shown in these two figures will become readily apparent.

Figure 1B:
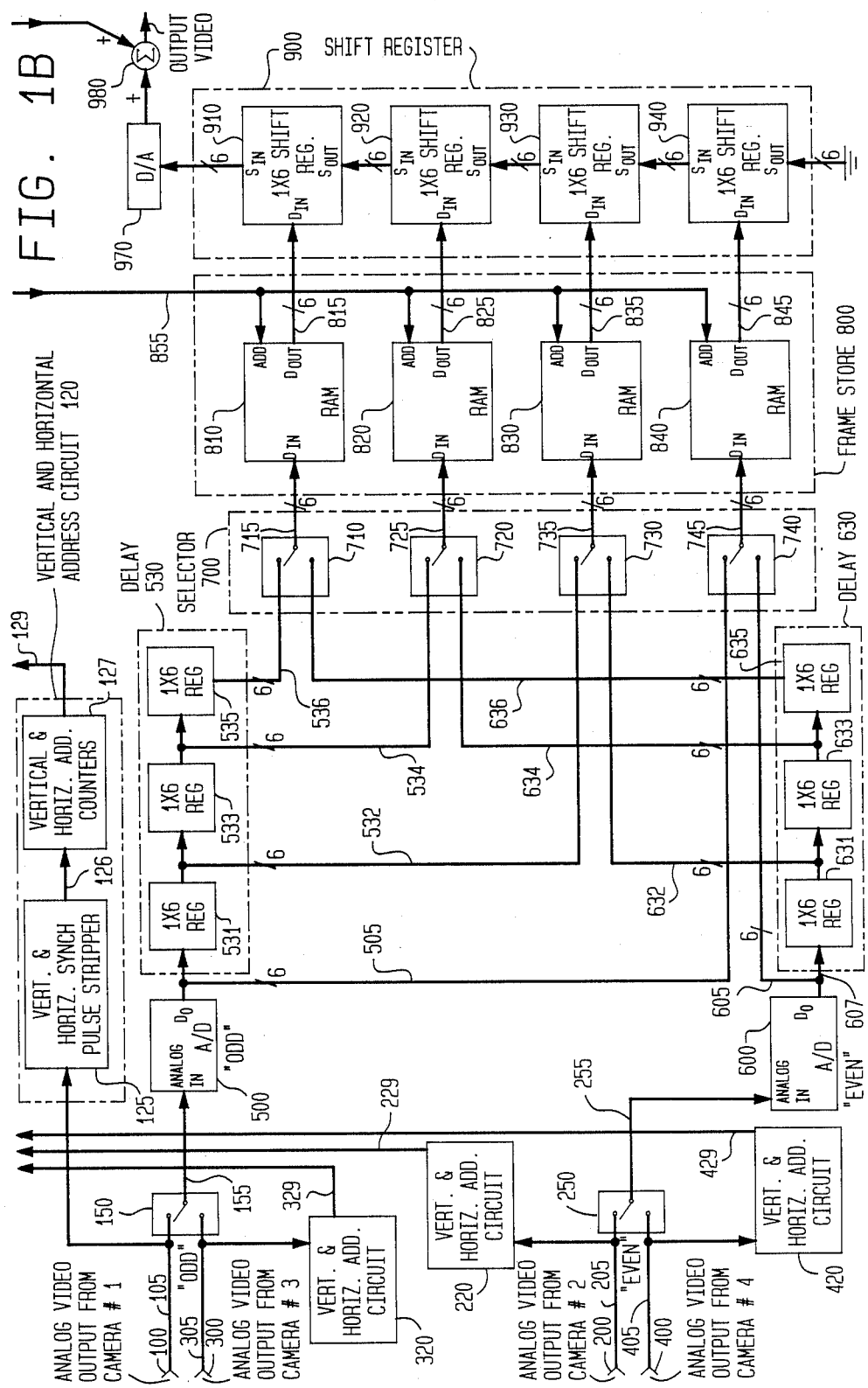

Generally speaking, the inventive multiple image video display system (the "system") simultaneously accepts individual analog video output signals from four standard asynchronously operating video cameras as input and, in response thereto, concurrently displays a single composite image on a remote monitor in which the video image obtained from each camera is dimensionally reduced by a factor of 2:1 and situated in a respective quadrant (corner) of the composite image. One preferred embodiment of this system, which incorporates the teachings of the present invention, is shown in FIGS. 1A and 1B—for which the proper alignment of the drawing sheets for these figures is shown in FIG. 1.

Specifically, four well-known video cameras (not shown), designated as cameras 1, 2, 3, and 4, provide analog video signals as input to the system. For reasons that will become clear shortly, these cameras are divided into two groups: the "odd" group consisting of cameras 1 and 3, and the "even" group consisting of cameras 2 and 4. Analog video signals from "odd" cameras 1 and 3 are applied as input to the system through terminals 100 and 300, respectively; while analog video signals from "even" cameras 2 and 4 are applied as input to the system through terminals 200 and 400, respectively. In order for the system to permit all the cameras to operate asynchronously—i.e. at any given time each camera is scanning a pixel situated at a location, within its respective scanned image, which is different from that of the pixels being scanned by the other three cameras, the system must keep track of the exact location of the current pixel being scanned by each camera. To do this, the analog video signal produced by each camera is fed to a separate vertical and horizontal address circuit which forms a multi-bit parallel address. Part of this address is the address of the particular vertical line then being scanned, and the remainder is the address of the particular pixel being scanned on that line. In order to fully display four complete frames of video information in the quadrants of one composite frame, the system compresses the incoming video data by 2:1 in each dimension. To do this, the system samples every other horizontal frame scan line in a video image (i.e. each line in one field) and every other pixel on each sampled scan line. Since most video images comprise 484 total scan lines (242 in each field) and each scan line has 512 individual pixels, the system samples 242 separate scan lines and 256 separate pixels on each of these scan lines. To simplify the following discussion, all references to particular pixels and scan lines comprising the individual images (e.g. first, second, third and fourth) will refer to only those pixels and scan lines that were sampled in each image; while references to pixels and scan lines of the composite image will refer to those specific pixels and scan lines that actually comprise this image.

Inasmuch as the vertical and horizontal address circuitry is identical for each camera, for the sake of brevity only that circuitry used in conjunction with camera 1 will now be discussed. As shown in FIG. 1B, the analog video signal produced by camera 1 is routed, via lead 105, from terminal 100 both to vertical and horizontal address circuit 120 and to selector 150. Circuit 120 contains vertical and horizontal synchronization pulse stripper 125 and vertical and horizontal address counters 127. This stripper is a well-known video circuit that extracts the vertical and horizontal synchronization ("synch") pulses from the incoming analog video signal and, in response to the occurrence of each synch pulse, feeds an appropriate signal over lead 126. This signal is, in turn, routed to vertical and horizontal counters 127 which continually increment their addresses to match the vertical and horizontal addresses of the pixel then being scanned by camera 1. The multi-bit parallel address produced by vertical and horizontal address circuit 120 is applied over leads 129 as one input to selector 860, which will be discussed shortly.

At the same time, the analog video produced by camera 1 is routed, as noted, by lead 105, to one input of selector 150. This selector determines which of the two camera output signals, i.e. the analog video output from camera 1 or that from camera 3, is to be routed, via lead 155, to analog-to-digital (A/D) converter 500 and therein converted to digital form for subsequent storage in frame store memory 800. To provide a resolution of 64 gray scale levels and operate within the desired frame store memory cycle time—as discussed in considerable detail later, converter 500 can be any 6 bit converter that can perform a complete analog-to-digital conversion in 250 nano-seconds or less.

Although video cameras ordinarily contain automatic gain control circuits (AGCs) to provide a proper output analog video signal under many changing light conditions, these circuits usually average light intensity changes occurring over an entire image and are thus unable to ignore changes, such as excessively bright spots, occurring in a non-desired area of the image. Consequently, in compensating for these excessively bright spots, the desired area would often be displayed with insufficient contrast and brightness. In addition, long cable runs and improper cable terminations can greatly change the received signal level. To ensure that any desired area of the image from camera 1 is always displayed with optimum brightness and contrast, A/D converter 500 can be advantageously replaced by a windowing AGC circuit which produces a parallel digital output and can be set to ignore light intensity changes occurring in predefined areas of the image. Such an AGC circuit is described in detail in applicant's U.S. patent application entitled "Combined Video AGC and Digitizing Circuit" filed May 2, 1985 and assigned Ser. No. 729,813 now U.S. Pat. No. 4,628,362 issued Dec. 9, 1986, the teachings of which are incorporated by reference herein.

For reasons that will shortly become clear, A/D converter 500 successively samples and digitizes the values of four adjacent pixels taken from those comprising the image scanned by camera 1. After camera 1 has completely scanned a full field, the process repeats for camera 3. For any group of four sampled pixels, the first three digital pixel values (the three "leading" pixels in any group of four) are successively shifted into delay circuit 530 which itself comprises three 1-by-6 bit registers 531, 533 and 535. Once all three values are fully shifted into the delay circuit and the fourth pixel has been fully digitized by the A/D converter, all four pixel values are routed through selector 700 and are simultaneously written into four separate sections of frame store memory 800.

Memory cycle time is advantageously saved through the use of two techniques. First, the values of four pixels, rather than that of just one pixel, are simultaneously written into or read from the frame store memory at any one time. Second, the frame store memory is constantly operated on an interleaved basis, i.e. every possible memory cycle is used and the memory is repetitively cycled between a read and a write operation—which will be discussed in detail in conjunction with FIGS. 3A and 3B. The relatively high data transfer rate provided by this mode of memory operation permits frame store memory 800 to be advantageously implemented using presently available large-capacity inexpensive N-type metal oxide semiconductor (NMOS) dynamic random access memory (DRAM) chips having a memory cycle time on the order of approximately 250-270 nano-seconds. This advantageously eliminates the need to construct frame store memory 800 from small sized DRAM chips which use relatively expensive but fast technologies (such as ECL or bipolar). Consequently, applicant's inventive system, through use of this interleaving technique, permits a high-capacity frame store memory to be implemented from relatively slow but inexpensive NMOS technology thereby providing substantial cost savings over multiple image video display systems known to art.

Specifically, frame store memory 800 holds the entire composite image consisting of four separate images, one from each camera. This memory is comprised of four separate RAM sections: RAM 810, RAM 820, RAM 830, and RAM 840. To perform an operation involving the frame store memory, selector 860 is first set, by various ones of control signals 55, to route an appropriate digital address onto memory address leads 855. There is one address for each group of four pixels. This address points to the particular location, within each memory section, that is being simultaneously accessed. As alluded to earlier, the frame store memory writes or reads four 6-bit pixel values simultaneously. One such pixel value is written into or read from each memory section. Each scanned image from each camera is stored across all four memory sections. In particular, RAM 810 holds the 1st, 5th, 9th, . . . pixels from all the images. RAM 820 holds the 2nd, 6th, 10th, . . . pixels from all the images. RAM 830 holds the 3rd, 7th, 11th, . . . pixels from all the images. Lastly, RAM 840 holds the 4th, 8th, 12th, . . . pixels from all the images.

To write a group of four pixels (e.g. the 1st, 2nd, 3rd and 4th pixels) from the image scanned by camera 1 into frame store memory 800, selector 860, shortly after A/D converter 500 completes digitizing the fourth pixel, selects the vertical and horizontal address appearing on leads 129 and routes this address to memory address leads 855. As noted, there is one memory address for each group of four pixels. Simultaneously with the appropriate address appearing on leads 855, the four digital pixel values are routed, via leads 505, 532, 534 and 536, through selector 700, and leads 745, 735, 725 and 715, to the data input, $D_{in}$, of each memory section. Once the addresses and data values have stabilized at the inputs to the memory (generally requiring a relatively short period of time on the order of a few nanoseconds), appropriate control signals are applied to each frame store memory section instructing it to write the pixel value appearing at its data input into the selected location.

At the conclusion of each write operation, the frame store memory undertakes a read operation in order to access four previously stored adjacent pixel values of the single composite image for display on the remote monitor (well-known and not shown). To do this, appropriate ones of control signals 55 instruct selector 860 to apply the display address appearing on leads 23 to leads 855 which, in turn, routes this address to each section of the frame store memory. The display address is generated by display clock 10 and display address counters 20. Display clock 10 produces a steady stream of clock pulses having a period of approximately 270 nano-seconds which matches the scan rate of the remote monitor. These clock pulses are applied to counters 20 in order to continuously increment their contents throughout all the addresses in the frame store memory. After a very short period of time sufficient to permit the display address to settle down on leads 855, appropriate ones of control signals 55 instruct each memory section to begin a read cycle at the location accessed by the display address. At the completion of each read cycle, the resulting four 6-bit pixel values are applied—via leads 815, 825, 835 and 845—as input to and are then loaded into shift register 900. This register consists of individual shift registers 910, 920, 930 and 940. Once output pixel data is provided by each section of frame store memory 800 on its output connections—$D_{out}$, no new pixel data will appear at these outputs until 540 nano-seconds later (i.e. until two successive memory cycles have expired). This occurs because the next memory cycle, 270 nano-seconds, is consumed by a write (from camera) operation, and the following memory cycle, 270 nano-seconds, is consumed by a subsequent read (for display) operation and no data will appear until after this latter read operation has been completed. Inasmuch as no new pixel data appears at the output of the memory during this time, this 540 nano-second interval can be used by the shift register to shift its contents out. Consequently, to shift any group of four pixel values out of register 900 within two memory cycle times, i.e. 540 nano-seconds, a clock signal running at 135 nano-seconds is applied, as one of control signals 55, to register 900 as a shift control signal. To ensure that all the pixel data in the frame store memory is read out at the proper rate for display on the remote monitor (at 135 nano-seconds/pixel) and no pixel data is lost thereby, register 900 is constantly loading four 6-bit pixel values from the frame store memory and successively shifting them out in 6-bit parallel form all within 540 nano-seconds thereafter. The connection of each individual shift register to a corresponding section of the frame store memory is such that the first pixel value to be displayed in any group of four pixels read from the memory appears in shift register 910 and is the first pixel value shifted out of register 900, and the last, fourth, pixel value in the group appears in register 940 and is the last pixel value in that group shifted out of shift register 900. The display address continually increments with each successive read cycle until all the pixel information for the entire composite image is read out from the frame store memory. At that point the display address is reset to point to the first (top left) pixel in this image, and the (display) read cycle repeats.

Each pixel value obtained from register 900 is applied as parallel input to digital-to-analog (D/A) converter 970 which, in turn, converts each 6-bit value into analog form. The resulting analog signal is the composite image information. For display on a remote monitor, well-known negative going vertical and horizontal synchronization pulses must be inserted at the right time into this analog signal before it is applied to the remote monitor. Display address counters 20, which determine the address of the current pixel being displayed on the remote monitor, also generates the appropriate negative vertical and horizontal synch pulses in a well-known fashion and at the proper times (e.g. a vertical synch pulse at the beginning of a frame, and a horizontal synch pulse at the beginning of each scan line) and applies both pulses as a negative composite synch signal to lead 25. Both the synch pulses appearing on lead 25 and the output of D/A 970 are applied to respective inputs of summer 980 which, in turn, combines these two analog signals to produce the analog video output signal which is then routed to the remote monitor.

Once four pixel values from an "odd" camera, i.e. either camera 1 or 3, have been written into frame store memory 800, selector 700 is instructed, by various ones of control signals 55, to switch over to the "even" cameras, i.e. either camera 2 or 4, and thereafter apply the output pixel value in A/D converter 600 and the three pixel values in delay 630 (comprising individual shift registers 631, 633 and 635)—via leads 605, 632, 634 and 636—as input to frame store memory 800. When these four pixels from an "even" camera have been written into the frame store memory, selector 700 is instructed to route the next group of four "odd" camera pixels to the frame store memory. This operation of alternately selecting and writing a group of four pixel values from an "even" camera and then from an "odd" camera with an interleaved (display) read cycle therebetween continues indefinitely with the switch-over between "odd" and "even" cameras occurring at intervals of 540 nanoseconds.

Selecting between either camera 1 or camera 3 within the "odd" cameras, as noted, and between either camera 2 or camera 4 within the "even" cameras is accomplished by selectors 150 and 250, respectively. The entire image (one complete field) is obtained from any one camera in a group, e.g. camera 1 in the "odd" group or camera 2 in the "even" group, and written into the frame store memory during successive memory write cycles for that camera before the setting of the selector for that group is changed. In other words, if selector 150 was set to select camera 3, and thereby route its analog video output, via lead 155, to A/D converter 500, then the entire image produced by camera 3 would be written into frame store memory 800 before the setting of that selector would be changed to camera 1. Likewise, if selector 250 was set to select camera 4, and thereby route its analog video output, via lead 255, to A/D converter 600, then the entire image produced by camera 4 would be written into the frame store memory before the setting of that selector would be changed to camera 2.

Figure 2:
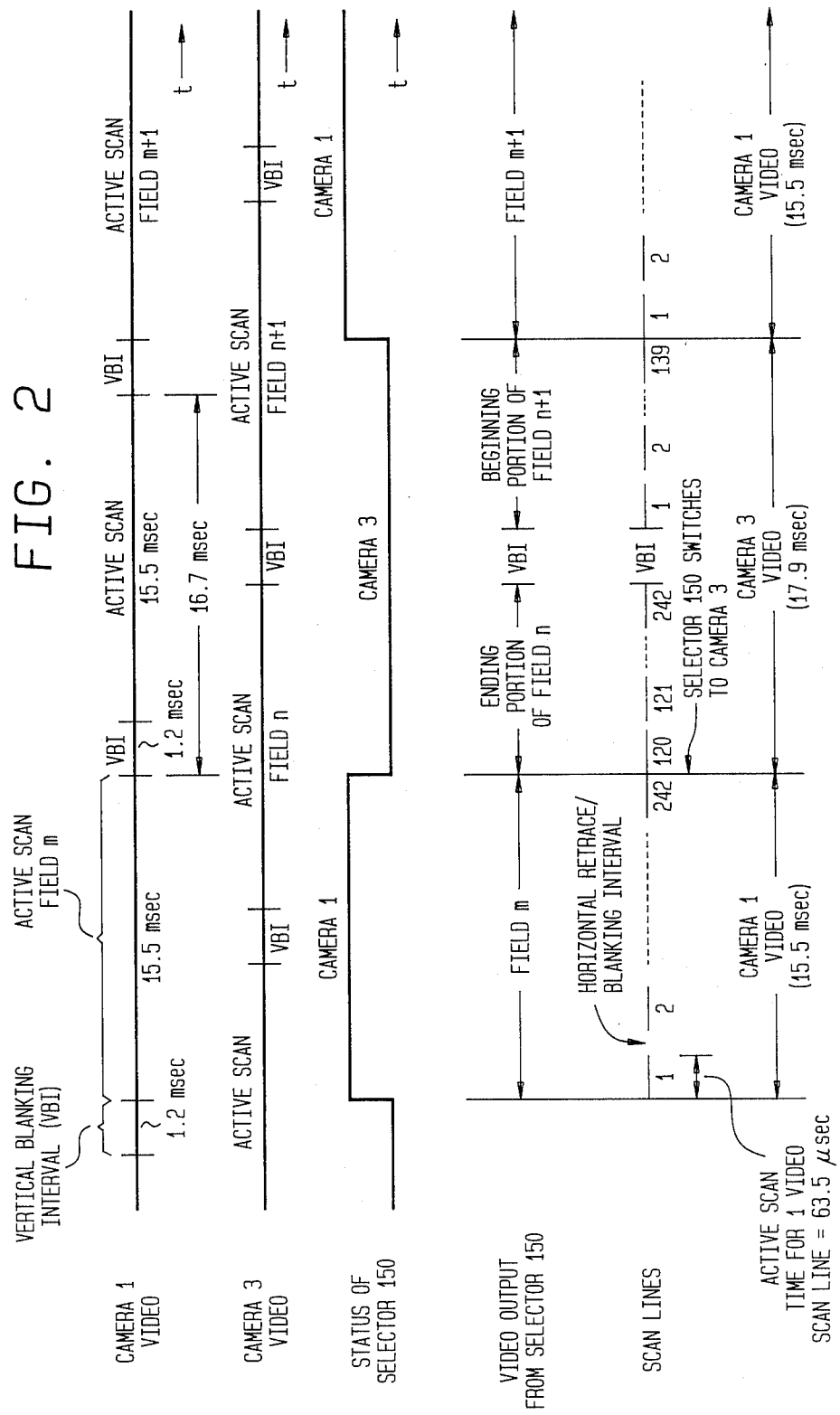
FIG. 2 depicts a simplified timing chart of the operation of the "odd" cameras in the system shown in FIGS. 1A and 1B.

Since all the cameras are generally not vertically synchronized with respect to each other, the point at which selector 150 switches from one "odd" camera, e.g. camera 1, to the other odd camera, e.g. camera 3, could occur while both cameras were scanning along different scan lines located within their respective fields. For example, selector 150 could switch to camera 1 after that camera has scanned two thirds of a field. At that point, the bottom third of the same field would be digitized and stored followed by the top two thirds of the next field scanned by camera 1, before selector 150 switches back to camera 3. Likewise, when that switch-over occurs, camera 3 may be scanning at any point within its respective field, e.g. along a scan line half way down the field. To prevent the frame store memory from writing pixel information starting at random pixel locations within the scanned fields produced by both "odd" cameras, selector 150 is slaved to the active period of camera 1. In particular, this selector switches from camera 3 to camera 1 at the completion of the vertical blanking interval for camera 1 and then switches back to camera 3 whenever camera 1 completes scanning its field. This operation is depicted in FIG. 2. Similarly, selector 250 is slaved to the operation of camera 2. In this manner, the frame store memory writes pixel information from only two of the cameras, i.e. cameras 3 and 4, starting at random pixel locations within their scanned fields, and writes pixel information for the other two cameras, i.e. cameras 1 and 2, starting at the beginning of their respective scanned fields.

As shown in FIG. 2, each camera requires approximately 16.7 milli-seconds to scan a field. Of this amount of time, 15.5 milli-seconds are consumed by active scanning and the remaining 1.2 milli-seconds are consumed by the vertical blanking interval (VBI) during which no scanning occurs. Selector 150 accepts pixel data from camera 1 only during its active scanning interval of 15.5 milli-seconds and switches over to camera 3 at the beginning of the vertical blanking interval for camera 1. This affords an extra 1.2 milli-second interval for pixels to be written from camera 3 into the frame store memory. As a result, sufficient time exists, before selector 150 switches back to camera 1, for camera 3 not only to scan its entire image but also to overlap some of its scan lines that were initially written into the memory. This overlap allows the system to obtain current pixel information for the region of the image where scanning started and thus assures a fully updated image. In particular, the extra 1.2 milli-second interval permits nineteen scan lines, i.e. scan lines 121 to 139, to be written a second time into the frame store memory, before selector 150 switches back to camera 1, thereby assuring that the frame store memory does not contain a non-updated pixel location even if the scanning rates of the cameras are slower than the ideal 60 Hz rate. Selector 250 operates in a similar fashion.

As shown in FIG. 2, the system starts writing pixel data from camera 3 while that camera is in its active scanning interval. Because selector 150 switched over to camera 3 when it illustratively began scanning scan line 120, the ending portion of field "n" is written into the frame store memory before the beginning portion of field "n+1" is written.

To write all the scanned images into the frame store memory at a maximum transfer rate, successive memory write cycles are alternately allocated on a continuous repetitive basis: one write cycle for the "odd" cameras and the next successive write cycle for the "even" cameras and so on. Inasmuch as memory read cycles (for display purposes) are interleaved between successive memory write cycles, the frame store memory will only write pixel data from any one particular group of cameras, e.g. from the "odd" group, once every 4 memory cycles, i.e. once every 1080 nano-seconds. These operations for frame store memory 800 are evident in the simplified timing chart shown in FIGS. 3A and 3B which will be discussed shortly. Consequently, once a group of four adjacent pixels from any camera has been written into the frame store, 1080 nano-seconds (four memory cycles) exist for the next group of four pixels from this camera to be digitized and appropriately shifted into the delay element, i.e. delay element 530 or 630. As previously discussed, these digitizing and shifting operations occur completely during this 1080 nano-second interval such that when the frame store memory is again able to write pixel data from this camera group, the next group of four pixel values is present at the memory input data connections, $D_{in}$, and the appropriate address of these pixels, as shown in FIGS. 3A and 3B, simultaneously appears, on memory address leads 855 of selector 860.

Since data from two different cameras are being alternately written into the frame store memory every two memory cycles (i.e. every 540 nano-seconds) with a memory read operation occurring in the intervening memory cycle, selector 860 changes its selected address, in response to various ones of control signals 55, every memory cycle. In particular, the selected address for memory write operations changes every two memory cycles from that produced by one of the vertical and horizontal address circuits for the "odd" cameras (i.e. circuits 120 or 320) to that produced by one of the identical circuits (i.e. circuits 220 or 420) for the "even" cameras. Moreover, selector 860 chooses a different one of the "odd" camera addresses (e.g. the address produced by circuit 120 for camera 1 or that produced by circuit 320 for camera 3) once the last pixel value (one complete field) from that camera has been written into the frame store memory. Between successive memory write operations, selector 860 routes the address generated by display address counters 20 to memory address leads 855 as the address for the memory read (display) operation.

FIGS. 3A and 3B provide a simplified timing chart of the operations performed by the major circuit blocks comprising the inventive multiple image video display system shown in FIGS. 1A and 1B and also shows the contents of some of these circuits, all at various times. The proper alignment of the drawing sheets for FIGS. 3A and 3B is shown in FIG. 3. For purposes of illustration, FIGS. 3A and 3B assume that camera 1 is scanning pixel "m" in its field at time zero (t=0 nano-seconds), the four pixel group at memory address "1" is being displayed at time t=270 nano-seconds, and camera 2 is scanning pixel "n" in its field at time t=540 nano-seconds. Time zero is an arbitrary point in time. In actuality, each camera in the system will be scanning other pixels than that shown; nonetheless, the temporal nature of the operations performed by the system will be identical to that shown in the chart.

As shown by FIGS. 3A and 3B, frame store memory 800 performs interleaved read and write operations. The write operations, occurring at intervals of 540 nano-seconds and shown on rows 3 and 4 of this figure, alternate between writing a group of four pixels from an "odd" camera, here shown as camera 1, and writing a four pixel group from an "even" camera, here shown as camera 2. As discussed above, the entire field from any one particular camera, e.g. camera 1 in the "odd" group or camera 2 in the "even" group, is written in groups of four pixels at 1080 nano-second intervals—see row 3 for camera 1 and row 4 for camera 2—before the system switches to the other camera in that group, here camera 3 (not shown) in the "odd" group and camera 4 (not shown) in the "even" group. Memory read operations, shown on row 5, for displaying a four pixel group occur at 540 nano-second intervals and are interleaved between adjacent memory write operations.

Selector 700—as shown on row 1—switches between routing a four pixel group from the "odd" cameras or from the "even" cameras every 540 nano-seconds. At intervals of 270 nano-seconds, selector 860—as shown on row 2—routes a different address to the frame store memory such that the memory either writes to or reads from the proper memory location.

Each four pixel group read from frame store memory 800 for display is loaded in parallel into shift register 900 and, during the next four 135 nano-second intervals, the individual pixels, P, comprising that group are shifted through shift registers 910, 920, 930 and 940 and then converted by D/A converter 970 into an analog voltage, V, which when combined with the proper synchronization pulses is applied as the output video. For example, during the time interval t=270 to 540 nano-seconds, pixels $P_{1-4}$, situated at memory address "1", have been read from frame store memory 800. At time t=540 nano-seconds, these same pixels are loaded into shift register 900. Thereafter, during the interval t=540 to 1080 nano-seconds, these same pixels, $P_{1-4}$, are shifted through shift register 900 and converted to a series of equivalent corresponding analog values, $V_{1-4}$. During this latter 540 nano-second interval, frame store memory 800 is performing a write operation for "even" camera 2 (interval t=540 to 810 nano-seconds) and a read operation at display address "2" (interval t=810 to 1080 nano-seconds). At t=1080 nano-seconds, the next successive group of four pixels in the displayed image, e.g. pixels $P_{5-8}$ situated at memory address 2 and available at the memory output leads, is loaded into shift register 900 and the shift operations are repeated and so on.

Clearly, as one can now readily appreciate and as indicated by FIGS. 3A and 3B, all of the above operations repetitively continue in parallel as long as the system operates. Of most importance, the frame store memory continuously alternates between successive interleaved read and write cycles involving groups of four pixels, with the write cycles themselves alternating between the "odd" and "even" cameras.

FIGS. 4A and 4B—for which the proper alignment of the drawing sheets for these figures is shown in FIG. 4—depict a modification of the multiple image video display system shown in FIGS. 1A and 1B. Clearly, the four individual image sources which form the composite image are not necessarily vertically synchronized with each other. Hence, any of these individual images can vertically "roll" with respect to any of other three individual images. All embodiments of the inventive system automatically correct for all synchronization differences occurring between all of the image sources, i.e. the video outputs of all the respective cameras. However, other display components, such as for example motion detectors, which do not form part of the inventive system but concurrently use the same image sources may require all these sources to be vertically synchronized. To easily adjust each of the four image sources vertically for the benefit of the other display components, the system shown in FIGS. 1A and 1B has been modified by the addition of vertical synch pulse mixer 960 to provide the capability of selectively inserting and displaying the individual vertical synch pulses (which typically last for 300–400 microseconds depending upon the camera used) comprising any or all of the individual images into the appropriate quadrant of the composite image. When displayed as part of an individual image—such as the image from camera 1 for example, the vertical synch pulses will appear as a white (or alternatively black) bar stretching across that image and extending over typically three or four adjacent horizontal scan lines. Once the vertical synch pulses are displayed, the vertical synchronization control on the respective camera, camera 1 in this case, or on its associated electronics, can then be rotated to bring that image into proper vertical alignment on the screen of the remote monitor—i.e. with the white (or black) bar moved off-image and situated to the top of the respective image. In particular, vertical synch pulse mixer 960 receives—via leads 961, 963, 965, and 967—all the extracted vertical synch pulses from the vertical synch stripper located within each of the four vertical and horizontal address circuits (circuits 120, 320, 220 and 420, respectively) connected to the video output of each of the four cameras. In response to each vertical synch pulse, vertical synch pulse mixer 960 routes the vertical synch pulse associated with a selected image, over lead 968, to one input to combiner 980 at the appropriate interval while that image is being displayed. Switch 962 is used either to disable the vertical synch pulse mixer—i.e. to inhibit the display of any vertical synch pulses, or to select whether the vertical synch pulses comprising any desired one or all of the individual images should be displayed. Inasmuch as the vertical synch pulse appearing at the input to combiner 980 can be set to extend either fully positive (e.g. +5 volts), or fully negative (e.g. −5 volts), the resulting video output produced by the combiner during the vertical synch pulse interval will be either all white or all black.

The system can be simplified from that shown in FIGS. 1A and 1B if only two frame store sections rather than four are read out at once. Specifically, if frame store sections 810 and 820 are read out together while frame store sections 830 and 840 undertake a write cycle, then less intermediate storage is needed and shift register 900 need only be half as large as that shown in the figures. Both memory operations should perferably not begin at the same time, but rather one should be delayed with respect to the other by two memory cycles. This implementation advantageously reduces component cost with no sacrifice in performance.

Moreover, additional components can be saved by using only one common horizontal address counter in the horizontal and vertical address circuits (circuits 120 and 320) for both "odd" cameras and another such common counter in these circuits (circuits 220 and 420) for both "even" cameras. This counter for each group of cameras would provide horizontal pixel addresses for one camera in that group, e.g. camera 1 in the "odd" group, before being used to provide horizontal pixel addresses for the other camera in that group, e.g. camera 3.

Although various embodiments have been shown and described herein, these embodiments merely illustrate the principles of the present invention. Clearly, many other embodiments, incorporating the teachings of the present invention, may be readily constructed by those skilled in the art.

I claim:

1. In a multiple image video display system, having a plurality of video images displayed and a single composite image, wherein each video image originates from a separate corresponding incoming video signal and is substantially simultaneously displayed in a separate non-overlapping section of said single composite image, the improvement comprising:
    means for repetitively selecting a successive one of a plurality of incoming video signals and writing at least one pixel value from said selected incoming video signal into a frame store memory during one of a plurality of succesive memory write operations involving said frame store memory;
    means for repetitively selecting at least one successive pixel value stored in said frame store memory and reading said selected successive pixel value from said frame store memory during read operation interleaved between two successive ones of said memory write operations; and
    the frame store memory, responsive to said repetitive selecting and writing means, and to said repetitive selecting and reading means, for storing values of pixels comprising said composite image and for repetitively performing a memory read operation interleaved between two successive ones of said memory write operations whereby said frame store memory operates at a sufficiently high data transfer rate to permit each of said video images to be substantially simultaneously displayed in a corresponding non-overlapping portion of the composite image.

2. The system in claim 1 further comprising means for continuously cycling the frame store memory between successive ones of said memory read and write operations.

3. The system in claim 2 wherein said repetitive selecting and writing means comprises:
    means for accepting analog video output signals from a plurality of video cameras as said plurality of said incoming video signals;
    first means, responsive to a first group comprised of pre-defined ones of said plurality of said incoming video signals, for selecting one of said incoming video signals from said first group to define a first selected video signal;
    second means, responsive to a second group comprised of pre-defined ones of said plurality of said incoming video signals, for selecting one of said incoming video signals from said second group to define a second selected video signal; and
    means for alternately applying said one pixel value from said first or second selected video signal as input to said frame store memory for said successive memory write operations.

4. The system in claim 3 wherein said first selecting means further includes means for choosing a next successive one of said incoming video signals comprising said first group after an entire field of video information, from a currently chosen one of said incoming video signals comprising said first group, has been written into said frame store memory.

5. The system in claim 4 wherein said second selecting means further includes means for choosing a next successive one of said incoming video signals comprising said second group after an entire field of video information, from a currently chosen one of said incoming video signals comprising said second group, has been written into said frame store memory.

6. The system in claim 5 wherein said first selecting means further comprises: means for selecting between a first pair of said incoming video signals, comprising said first group and originating from one respective pair of said video cameras, in order to define said first selected video signal; and wherein said second selecting means further comprises: means for selecting between a second pair of said incoming video signals, comprising said second group and originating from a different respective pair of said video cameras, to define said second selected video signal.

7. The system in claim 6 wherein said repetitive selecting and writing means further comprises:
    means for converting said first and second selected video signals into respective first and second digital equivalent signals;

third means for selecting either said first or said second digital equivalent signal to be an intermediate digital signal;

means for applying at pre-defined times said intermediate digital signal as input data to said frame store memory;

means for detecting synchronization pulses occurring in each of said incoming video signals and, in response thereto, forming a corresponding video address for each of said incoming video signals;

means, operative in response to a display clock, for generating a display address;

means, responsive to all of said video addresses and to said display address, for selecting one of said video addresses or said display address as a memory address and for applying said memory address at said pre-defined times to said frame store memory; and wherein said repetitive selecting and reading means comprises: means, responsive to said selected successive pixel values read from said frame store memory and located at said memory address, for transforming said read pixel values into a form suitable for display on a video monitor as said composite image.

8. The system in claim 7 wherein said third selecting means alternately selects said first digital equivalent signal or said second digital equivalent signal as said intermediate digital signal for use during each successive one of said memory write operations.

9. The system in claim 8 wherein the repetitive selecting and writing means further comprises means, responsive to said first and second digital equivalent signals, for storing each of three leading ones of four successive pixels which comprise each of said first and second digital equivalent signals so that all four of said pixels comprising said first and second digital equivalent signals can be simultaneously applied to respective inputs of said third selecting means.

10. The system in claim 7 wherein the frame store memory is comprised of at least four separate random access memory sections wherein all sections are accessed during each of said memory read operations and during each of said memory write operations.

11. The system in claim 10 wherein each of said memory sections stores every fourth sampled pixel in a sequence of pixels comprising each of said video images.

12. The system in claim 10 wherein said frame store memory further comprises two groups, each comprised of two of said memory sections, wherein one group performs a memory write operation to store pixel data while the other group substantially simultaneously performs a memory read operation to produce output video information.

13. The system in claim 7 wherein said transforming means comprises:

a register, responsive to a clock signal, for accepting each one of a group of at least four pixel values simultaneously read out from corresponding ones of said memory sections and for providing a sequential stream of single ones of said read out pixel values;

a digital-to-analog converter responsive to said sequential stream of read out pixel values for converting each of said single pixel values into analog form to form an intermediary analog signal;

means, operative in response to said display clock, for producing synchronization pulses for said composite image, and a summer for combining said intermediary analog signal and said composite image synchronization pulses to produce an output video signal for display on said video monitor as said composite image.

14. The system in claim 13 wherein said register comprises a plurality of separate serially connected shift registers each of which is connected to a corresponding one of said memory sections such that the sequence in which individual pixels are shifted out of the register matches the sequence in which these pixels are displayed on the video monitor.

15. The system in claim 14 wherein the register is operated at a rate which is at least twice as fast as a cycle time of said frame store memory.

16. The system in claim 7 wherein the detecting and forming means further comprises:

means, responsive to a corresponding one of said incoming video signals, for extracting vertical and horizontal synchronization pulses occurring therein; and means, responsive to said extracted vertical and horizontal synchronization pulses, for generating an address of the current pixel being scanned by the camera which provides said corresponding incoming video signal so as to define a corresponding one of said video addresses.

17. The system in claim 16 wherein said address generating means comprises separate first and second counters for providing a respective vertical and a respective horizontal address associated with said current pixel.

18. The system in claim 16 wherein said address generating means comprises a first group of counters, wherein each of said counters comprising said first group provides a vertical pixel address for an associated one of said video cameras, and a second group of counters, wherein each counter comprising said second group provides a horizontal pixel address for both cameras comprising each of said pairs of said video cameras.

19. The system in claim 7 further comprising:

means, responsive to the detected vertical and horizontal synchronization pulses occurring in each of said incoming video signals, for injecting vertical and horizontal synchronization pulses from a selected one of said incoming video signals into said output video signal at appropriate times for display on said video monitor as part of an associated one of said video images.

20. In a method for use in a multiple image video display system having a plurality of video images displayed as a single composite image wherein each video image originates from a separate corresponding incoming video signal and each of said video images is stored in a frame store memory and thereafter substantially simultaneously displayed in a separate non-overlapping section of said single composite image, the improvement comprising the steps of:

repetitively selecting a successive one of a plurality of incoming video signals and writing at least one pixel value from said selected incoming video signal into the frame store memory during one of a plurality of successive memory write operations, and repetitively selecting at least one successive pixel value stored in said frame store memory and reading said selected successive pixel value from said frame store memory during each memory read operation interleaved between two successive ones of said memory write operations, whereby said frame store memory operates at a sufficiently high data transfer rate to permit each of said video images to be substantially simultaneously displayed in corresponding non-overlapped portions of the composite image.

21. The method in claim 20 further comprising the step of continuously cycling the frame store memory between said successive ones of said memory read and write operations.

22. The method in claim 21 wherein said repetitive selecting and writing step further comprises the steps of:
accepting analog video output signals from a plurality of video cameras as said plurality of said incoming video signals;
selecting, in response to a first group of pre-defined ones of said plurality of said incoming video signals, one of said incoming video signals from said first group to define a first selected video signal;
selecting, in response to a second group comprised of pre-defined ones of said plurality of said incoming video signals, one of said incoming video signals from said second group to define a second selected video signal; and
alternately applying said one pixel value from said first or said second selected video signal as input to said frame store memory for said successive write operations.

23. The system in claim 22 wherein said first video signal selecting step further includes the step of choosing a next successive one of said incoming video signals comprising said first group after an entire field of video information, from a currently chosen one of said incoming video signals comprising said first group, has been written into said frame store memory.

24. The system in claim 23 wherein said second video signal selecting step includes the step of choosing a next successive one of said incoming video signals comprising said second group after an entire field of video information, from a currently chosen one of said incoming video signals in said second group, has been written into said frame store memory.

25. The method in claim 24 wherein the first video signal selecting step includes the step of selecting between a first pair of said incoming video signals, comprising said first group and originating from one pair of said video cameras, in order to define said first selected video signal; and said second video signal selecting step includes the step of selecting between a second pair of said incoming video signals, comprising said second group and originating from a different pair of said video cameras, in order to define said second selected video signal.

26. The method in claim 25 wherein the repetitive selecting and writing step further includes the steps of:
converting said first and second selected video signals into respective first and second digital equivalent signals;
selecting said first or said second digital equivalent signal as being an intermediate digital signal;
applying at pre-defined times said intermediate digital signal as input data to said frame store memory;
detecting synchronization pulses occurring in each of said incoming video signals and, in response thereto, forming a corresponding video address for each of said incoming video signals;
generating a display address in response to a display clock;
selecting, in response to all of said video addresses and to said display address, one of said video addresses or said display address as a memory address and applying said memory address at said pre-defined times to said frame store memory;
reading said selected successive pixel values stored at said selected memory address from said frame store memory; and
converting said selected successive pixel values, read from said frame store memory, into a form suitable for display on a video monitor as said composite image.

27. The method in claim 26 wherein said first or second digital equivalent selecting step includes the step of alternately selecting said first digital equivalent signal or said second digital equivalent signal as said intermdiate digital signal for use during each successive one of said memory write operations.

* * * * *